United States Patent
Zhang et al.

(10) Patent No.: US 9,467,052 B2
(45) Date of Patent: Oct. 11, 2016

(54) ADAPTIVE CONTROL SCHEME OF VOLTAGE REGULATOR FOR LIGHT AND SINKING LOAD OPERATION

(71) Applicant: DELL PRODUCTS, L.P., Round Rock, TX (US)

(72) Inventors: Kejiu Zhang, Round Rock, TX (US); Shiguo Luo, Austin, TX (US); Lisa Li, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 106 days.

(21) Appl. No.: 14/580,418

(22) Filed: Dec. 23, 2014

(65) Prior Publication Data
US 2016/0181921 A1   Jun. 23, 2016

(51) Int. Cl.
H02M 1/088 (2006.01)
H02M 1/36 (2007.01)
H02M 3/158 (2006.01)

(52) U.S. Cl.
CPC ................................. H02M 3/158 (2013.01)

(58) Field of Classification Search
CPC ...... H02M 1/088; H02M 1/36; H02M 3/156; H02M 3/1588
USPC .......................... 323/271, 282, 284, 285, 901
See application file for complete search history.

(56) References Cited

U.S. PATENT DOCUMENTS

| | | | |
|---|---|---|---|
| 6,661,210 B2 | 12/2003 | Kimball et al. | |
| 6,737,840 B2 | 5/2004 | McDonald et al. | |
| 7,282,900 B2 | 10/2007 | Oswald et al. | |
| 7,352,159 B2 | 4/2008 | Luo et al. | |
| 7,498,783 B2 | 3/2009 | Johnson | |
| 8,358,115 B2 | 1/2013 | Luo et al. | |
| 8,541,993 B2 | 9/2013 | Notman et al. | |
| 2008/0265683 A1 | 10/2008 | Zhu et al. | |
| 2008/0284398 A1* | 11/2008 | Qiu ........................ | H02M 3/156 323/283 |
| 2009/0066301 A1* | 3/2009 | Oswald ............... | H02M 3/1582 323/271 |
| 2011/0018516 A1* | 1/2011 | Notman .............. | H02M 3/1588 323/284 |
| 2013/0027009 A1 | 1/2013 | Tang et al. | |
| 2014/0354256 A1* | 12/2014 | Li .......................... | H02M 3/156 323/283 |

* cited by examiner

*Primary Examiner* — Jeffrey Sterrett
(74) *Attorney, Agent, or Firm* — Eustance P. Isidore; Isidore PLLC

(57) ABSTRACT

A switching DC-DC voltage regulator (VR) provides for light and sinking loads by compute components of an information handling system (IHS). A controller detects a load current value and a voltage output value of a synchronous Buck VR. In response to detecting that the load current value is less than a threshold value, the controller drives a high side control switch (HS) and low side synchronous switch (LS) to regulate an output voltage value across a capacitor by causing an inductor current ripple through an inductor of the synchronous Buck VR in discontinuous conduction mode (DCM) to reduce power consumption during a light load. In response to detecting an electrical characteristic indicative of a voltage overshoot of the output voltage, the controller drives the HS and LS to cause the synchronous Buck VR to perform forced continuous conduction mode (FCCM) to sink the load current each switching cycle.

22 Claims, 8 Drawing Sheets

ADAPTIVE CONTROL SCHEME OF VOLTAGE REGULATOR FOR LIGHT AND SINKING LOAD OPERATION

BACKGROUND

1. Technical Field

The present disclosure generally relates to voltage regulators, and more particularly to DC-DC or switching voltage regulators and methods for controlling such voltage regulators in an information handling system.

2. Description of the Related Art

As the value and use of information continues to increase, individuals and businesses seek additional ways to process and store information. One option available to these users is an information handling system (IHS). An IHS generally processes, compiles, stores, and/or communicates information or data for business, personal, or other purposes thereby allowing users to take advantage of the value of the information. Because technology and information handling needs and requirements vary between different users or applications, IHSs may vary with respect to the type of information handled; the methods for handling the information; the methods for processing, storing or communicating the information; the amount of information processed, stored, or communicated; and the speed and efficiency with which the information is processed, stored, or communicated. The variations in IHSs allow for IHSs to be general or configured for a specific user or specific use such as financial transaction processing, airline reservations, enterprise data storage, or global communications. In addition, IHSs may include or comprise a variety of hardware and software components that may be configured to process, store, and communicate information and may include one or more computer systems, data storage systems, and networking systems.

IHSes typically include a number of electronic components that are sensitive to alterations in the voltage being supplied for the components to operate. Excessive positive or negative voltage surge events can cause catastrophic failure to the components. To provide appropriately regulated DC-DC voltage conversion for sensitive components, IHSes typically have a number of synchronous Buck voltage regulators (VRs). For instance, a typical portable IHS can have synchronous Buck VRs providing different level voltage to components such as a central processing unit (CPU), I/O (Input/Output) Controller Hub (ICH), hard disk drive, and memory. Examples of memory components include double data rate type three (DDR3) and type 4 (DDR4) synchronous dynamic random access memory (SDRAM).

Generally-known IHSes configure a synchronous Buck VR in discontinuous conduction mode (DCM), relying on pulse frequency modulation (PFM) to achieve power efficiency for light loads. For applications that can experience heavy sink currents that could lead to an over voltage condition, the synchronous Buck VRs are configured for forced continuous conduction mode (FCCM) in all operational conditions. In FCCM, sink loads, if there are any, can be (a) sunk entirely to ground (GND) when a low side synchronous switch (LS) is turned on and/or (b) sunk to input voltage (VIN) node when a high side control switch (HS) is turned on as well as during dead-times. The system reliability is ensured since there is no over voltage protection (OVP) event caused by sink load. The drawback of FCCM is the power conversion loss of VR during light load suffers. Thus the generally-known solution to avoid over voltage conditions is not suitable for IHSes with a concentration on light load features.

BRIEF SUMMARY

According to at least one aspect of the present disclosure, an information handling system (IHS) includes a switching direct current to direct current (DC-DC) voltage regulator (VR) for sourcing and sinking loads. In one embodiment, a synchronized Buck VR includes an inductor electrically connected between a phase node and an output node. A capacitor is electrically connected between the output node and ground. A high side control switch (HS) is electrically connected between a DC input power supply and a phase node. A low side synchronous switch (LS) is electrically connected between ground (GND) and the phase node. A load current sensor is inherently built in low side switch (LS) or through a RC network cross the output inductor to detect a load current value. An output voltage sensor is electrically connected across the output node and GND to detect an output voltage value. A controller is placed/provided in electrical connection with the HS and the LS and in electrical communication with the load current sensor and the output voltage sensor, to regulate the output voltage value across the capacitor, and to provide the needed load current, by switching on and off the HS and LS to cause a DC inductor current with ripple through the inductor.

According to at least one aspect of the present disclosure, a method is provided for switching DC-DC voltage regulation for light and sinking loads. In one embodiment, the method includes detecting a load current value and a voltage output value of a synchronous Buck VR. The method includes regulating an output voltage value across a capacitor by causing an inductor current ripple through an inductor of the synchronous Buck VR. In response to detecting that the load current value is less than a threshold value, the method includes driving HS and LS to perform discontinuous conduction mode (DCM) to reduce power consumption during a light load. In response to detecting an electrical characteristic indicative of a voltage overshoot of the output voltage, the method includes driving the HS and LS to cause the synchronous Buck VR to perform forced continuous conduction mode (FCCM) in order to avoid or mitigate (or substantially reduce) a voltage output overshoot condition by sinking the load current each switching cycle.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

Figure 1:
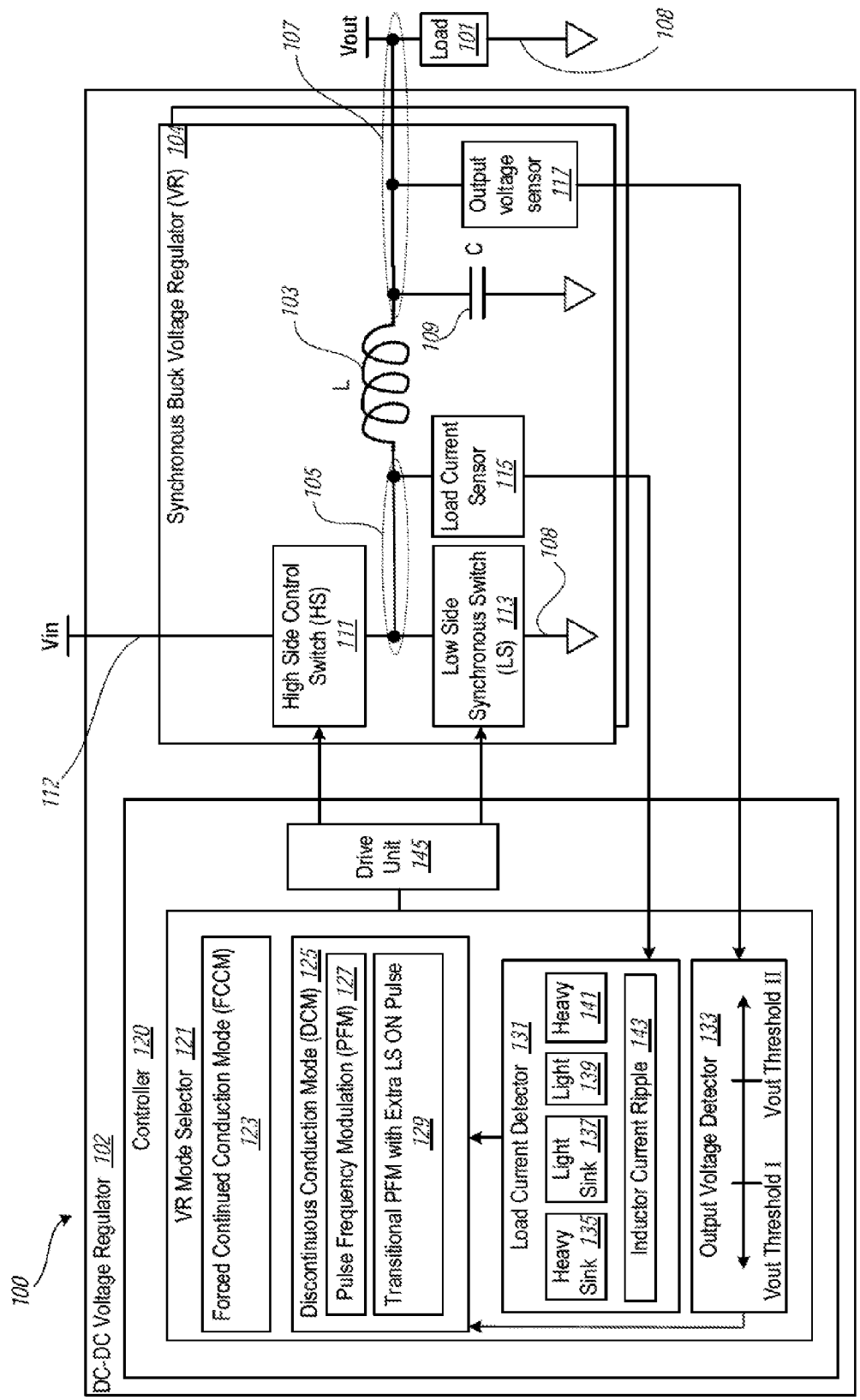
FIG. 1 illustrates a block diagram of a switching direct current to direct current (DC-DC) voltage regulator (VR) for sourcing and sinking loads, according to one or more embodiments.

The illustrative embodiments of the present disclosure provide an Information Handling System (IHS) having a switching DC-DC voltage regulator (VR) that performs a control method to efficiently handle light loads and light sink loads while avoiding an overvoltage condition for sink loads and heavy sink loads. VRs capable of slowing down the switching frequency during light load are widely adopted in computing industry. However, this feature in nature prohibits the sinking load operation mode, such as memory termination logic MEM_VTT. By being responsive to at least inductor current, the switching DC-DC VR introduced by the present disclosure can switch between discontinuous conduction mode (DCM) for efficient power regulation in lights loads and forced continuous conduction mode (FCCM) to avoid over shooting a regulated output voltage for sink loads.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 2:
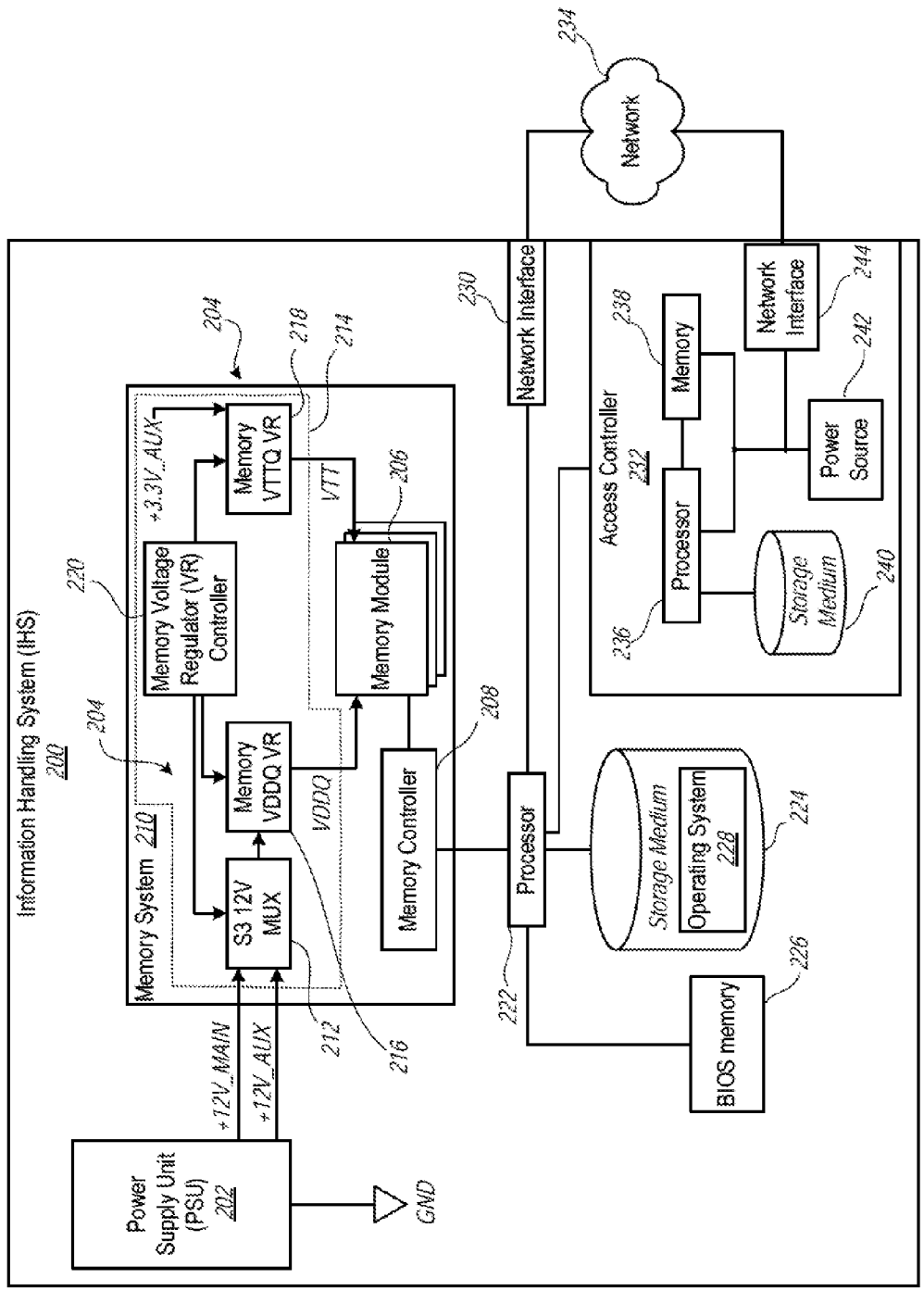
FIG. 2 illustrates a block diagram of an information handling system (IHS) that includes the switching DC-DC VR of FIG. 1 for supplying power to a memory system, according to one or more embodiments.

FIG. 1 illustrates a switching direct current to direct current (DC-DC) VR 102 for light and sinking loads 101 that can be utilized within an information handling system (IHS), such as IHS 200 (FIG. 2). For purposes of this disclosure, an information handling system, such as IHS 200, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable media may include any instrumentality or aggregation of instrumentalities that may retain data and/or instructions for a period of time. Computer-readable media may include, for example without limitation: storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Referring specifically to the illustrative embodiment of FIG. 1, a synchronized Buck VR 104 includes an inductor (L) 103 electrically connected between a phase node 105 and an output node 107. A capacitor (C) 109 is electrically connected between the output node 107 and ground (GND) 108. A high side control switch (HS) 111 is electrically connected between an input voltage from a power supply (Vin) 112 and the phase node 105. A low side synchronous switch (LS) 113 is electrically connected between a ground (GND) 108 and phase node 105. A load current sensor 115 senses the load current value by either (a) inductor DC resistance (DCR) method or (b) LS drain-to-source resistance (Rdson) method. An output voltage sensor 117 is electrically connected across the output node 107 and the ground (GND) 108 to detect an output voltage value. A controller 120 is placed in electrical connection with the HS 111, the LS 113, the load current sensor 115 and the output voltage sensor 117 and receives and/or transmits signals to/from these components to regulate the output voltage value across the capacitor 109 by switching on and off the HS 111 and LS 113 to cause an inductor current ripple through the inductor 103. Given the various transfers of signals and information, for purposes of the disclosure, the controller 120 is described as being in electrical communication with these various components. In one embodiment, the controller 120 detects the load current value and the voltage output value of the synchronous Buck VR 104. In response to detecting that the load current value is less than a threshold value, the controller 120 drives the HS 111 and LS 113 to cause the synchronous Buck VR 104 to perform discontinuous conduction mode (DCM) to reduce power consumption during a light load. In response to detecting an electrical characteristic indicative of an overshoot (i.e., overshoot of the output voltage), the controller 120 drives the HS 111 and LS 113 to cause the synchronous Buck VR 104 to perform forced continuous conduction mode (FCCM), which sinks the load current each switching cycle, in order to avoid, mitigate, or substantially reduce or eliminate a voltage output overshoot condition.

In one embodiment, the controller 120 incorporates a VR mode selector component 121 that can draw upon defined switching algorithms or circuitry of an FCCM utility 123 or a DCM utility 125. The DCM utility 125 can further include a pulse frequency modulation (PFM) utility 127 and a transitional PFM utility 129 for including an extra LS on pulse per cycle. The VR mode selector component 121 can select an appropriate mode based on a load current detector 131 that is in communication with the load current sensor 115. Alternatively or in addition, the VR mode selector component 121 can select an appropriate mode based on an output voltage detector 133 that is in communication with the output voltage sensor 117. The load current detector 131 in cooperation with information from the output voltage detector 133 can detect electrical characteristics such as a heavy sink characteristic 135, a light sink characteristic 137, a light load characteristic 139, a heavy load characteristic 141, and an inductor current ripple 143. The output voltage detector 133 can detect whether an error in the output voltage is either positive or negative. The error of the output voltage is defined as the internal voltage reference minus the feedback output voltage. The output voltage detector 133 can also compare an output voltage value against a lower voltage threshold (Vout Threshold I) and an upper voltage threshold (Vout Threshold II). The controller 120 can interface with the HS 111 and LS 113 via a drive unit 145 that provides appropriate switching signals.

FIG. 2 illustrates a two-dimensional block diagram representation of an example of an IHS 200 within which one or more of the described features of the various embodiments of the disclosure can be implemented. As depicted in FIG. 2, IHS 200 may include a processor 222, a memory system 210 communicatively coupled to processor 222, and a storage medium 224 communicatively coupled to processor 222. Processor 222 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 222 may interpret and/or execute program instructions and/or process data stored and/or communicated by one or more of memory system 210, storage medium 224, and/or another component of IHS 200. Processor 222 may be coupled to other components (not shown) with optional interfaces (I/Fs) via a PCIe (Peripheral Component Interconnect Express) interface, for example.

Memory system 210 may be communicatively coupled to processor 222 and may comprise any system, device, or apparatus operable to retain program instructions or data for a period of time (e.g., computer-readable media). For example without limitation, memory system 210 may comprise RAM, EEPROM, a PCMCIA card (Personal Computer Memory Card International Association standard conformant expansion card), flash memory, magnetic storage, opto-magnetic storage, or any suitable selection and/or array of volatile or non-volatile memory that retains data after power to IHS 200 is turned off. In particular embodiments, memory system 210 may comprise dynamic random access memory (DRAM).

Memory system 210 may include the memory controller 208, and one or more memory modules 206 communicatively coupled to memory controller 208. Memory controller 208 may be any system, device, or apparatus configured to manage and/or control the memory system 210. For example, memory controller 208 may be configured to read data from and/or write data to memory module(s) 206 comprising memory system 210. Additionally or alternatively, memory controller 208 may be configured to refresh memory module(s) 206 in embodiments in which memory system 210 comprises DRAM or another type of volatile memory. Although memory controller 208 is shown in FIG. 2 as an integral component of memory system 210, memory controller 208 may be separate from memory system 210 and/or may be an integral portion of another component of IHS 200 (e.g., memory controller 208 may be integrated into processor 222). Each memory module(s) 206 may include any system, device or apparatus configured to retain program instructions and/or data for a period of time (e.g., computer-readable media). Each memory module(s) 206 may include a DRAM module (e.g., a dual in-line package (DIP) memory, a Single In-line Pin Package (SIPP) memory, a Single Inline Memory Module (SIMM), a Ball Grid Array (BGA), or any other suitable memory.

Storage medium 224 may be communicatively coupled to processor 222. Storage medium 224 may include any system, device, or apparatus operable to store information processed by processor 222. Storage medium 224 may include, for example, network attached storage, one or more direct access storage devices (e.g., hard disk drives), and/or one or more sequential access storage devices (e.g., tape drives). As shown in FIG. 2, storage medium 224 may have stored thereon an operating system (OS) 228. OS 228 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 228 Active portions of OS 228 may be transferred to memory system 210 for execution by processor 222.

A basic input/output system (BIOS) memory 226 may be included in or be separate from the memory system 210. A flash memory or other nonvolatile memory may be used as the BIOS memory 226. A BIOS program (not expressly shown) may typically be stored in the BIOS memory 226. The BIOS program may include software that facilitates interaction with and between the IHS devices such as a keyboard (not expressly shown), a mouse (not expressly shown), and/or one or more I/O devices. BIOS memory 226 may also include UEFI (Unified Extensible Firmware Interface) or BIOS (basic input/output system) firmware that store system code (note expressly shown) operable to control a plurality of basic IHS operations. IHS 200 may operate by executing BIOS for a system firmware in response to being powered up or reset. BIOS may identify and initialize components of IHS 200 and cause an operating system to be booted.

As depicted in FIG. 2, IHS 200 may also include a network interface 230 communicatively coupled to processor 222, and an access controller 232 coupled to processor 222. Network interface 230 may include any suitable system, apparatus, or device operable to serve as an interface between IHS 200 and network 234. Network interface 230 may enable IHS 200 to communicate over network 234 using any suitable transmission protocol and/or standard, including without limitation all transmission protocols and/or standards enumerated below with respect to the discussion of network 234. In certain embodiments, network interface 230 may be configured with hardware, software, and/or firmware to allow its associated IHS 200 to boot from a computer-readable medium remote from IHS 200 (e.g., a computer-readable medium coupled to network interface 230 via network 234).

Access controller 232 may be any system, device, apparatus or component of IHS 200 configured to permit an administrator or other person to remotely monitor and/or remotely manage IHS 200 (e.g., via an IHS remotely connected to IHS 200 via network 234) regardless of whether IHS 200 is powered on and/or has an operating system installed thereon. In certain embodiments, access controller 232 may allow for "out-of-band" control of IHS 200, such that communications to and from access controller 232 are communicated via a management channel physically isolated from the "in band" communication with network interface 230. Thus, for example, if a failure occurs in IHS 200 that prevents an administrator from remotely accessing the IHS 200 via network interface 230 (e.g., operating system failure, power failure, etc.), the administrator may still be able to monitor and/or manage the IHS 200 (e.g., to diagnose problems that may have caused failure) via access controller 232. In the same or alternative embodiments, access controller 232 may allow an administrator to remotely manage one or more parameters associated with operation of IHS 200 (e.g., power usage, processor allocation, memory allocation, security privileges, etc.). In certain embodiments, access controller 232 may include or may be a Baseboard Management Controller (BMC), a Management Engine (ME), or an integral part of a Dell Remote Access Controller (DRAC) or an Integrated Dell Remote Access Controller (iDRAC).

As depicted in FIG. 2, access controller 232 may include a processor 236, a memory 238 communicatively coupled to processor 236, storage media 240, a network interface 244 communicatively coupled to processor 236, and a power source 242 electrically coupled to processor 236. Processor 236 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data. In some embodiments, processor 236 may interpret and/or execute program instructions and/or process data stored in memory 238 and/or another component of IHS 200.

Memory 238 may be communicatively coupled to processor 236 and may include any system, device, or apparatus configured to retain program instructions and/or data for a period of time (e.g., computer-readable media). By way of example without limitation, memory 238 may include RAM, EEPROM, a PCMCIA card, flash memory, magnetic storage, opto-magnetic storage, or any suitable selection and/or array of volatile or non-volatile memory that retains data after power to IHS 200 is turned off or power to access controller 232 is removed. Network interface 244 may include any suitable system, apparatus, or device operable to serve as an interface between access controller 232 and network 234. Network interface 244 may enable the access controller 232 to communicate over network 234 using any suitable transmission protocol and/or standard, including without limitation all transmission protocols and/or standards enumerated below with respect to the discussion of network 234.

The example IHS 200 can include a power supply unit (PSU) 202 that converts a main alternating current (AC) power supply to low-voltage regulated DC power used by switching DC-DC VRs. Certain components require additional voltage regulation to provide another voltage level or to maintain power characteristics within an acceptable range even for varying, bidirectional electrical loads. In one or more embodiments, synchronous Buck VRs 104 (FIG. 1) are capable of slowing down a switching frequency during light load, in accordance with certain embodiments of the present disclosure. In addition, the synchronous Buck VRs 104 are able to perform a sinking load operation mode, such as for MEM_VTT to memory module(s) 206 that are controlled by a memory controller 208 of a memory system 210. A control mode of the synchronous Buck VRs 104 can be adaptively changed based on all loading behaviors of server applications including light, heavy, light sink, and heavy sink loads. The light load efficiency is improved and VR regulation is maintained.

In accordance with one embodiment, FIG. 2 illustrates PSU 202 providing +12V_MAIN and +12V_AUX power via an S3 12V MUX 212 to a memory voltage regulator system 214 that supports the memory system 210. A memory VDDQ VR 216 provides VDDQ to the memory module(s) 206 and a memory VTTQ VR 218 provides VTT to the memory module(s) 206. In certain embodiments, IHS 200 may comprise a computer chassis or enclosure (e.g., a server chassis holding one or more server blades). In other embodiments, IHS 200 may be a personal computer (e.g., a desktop computer or a portable computer).

Figure 3:
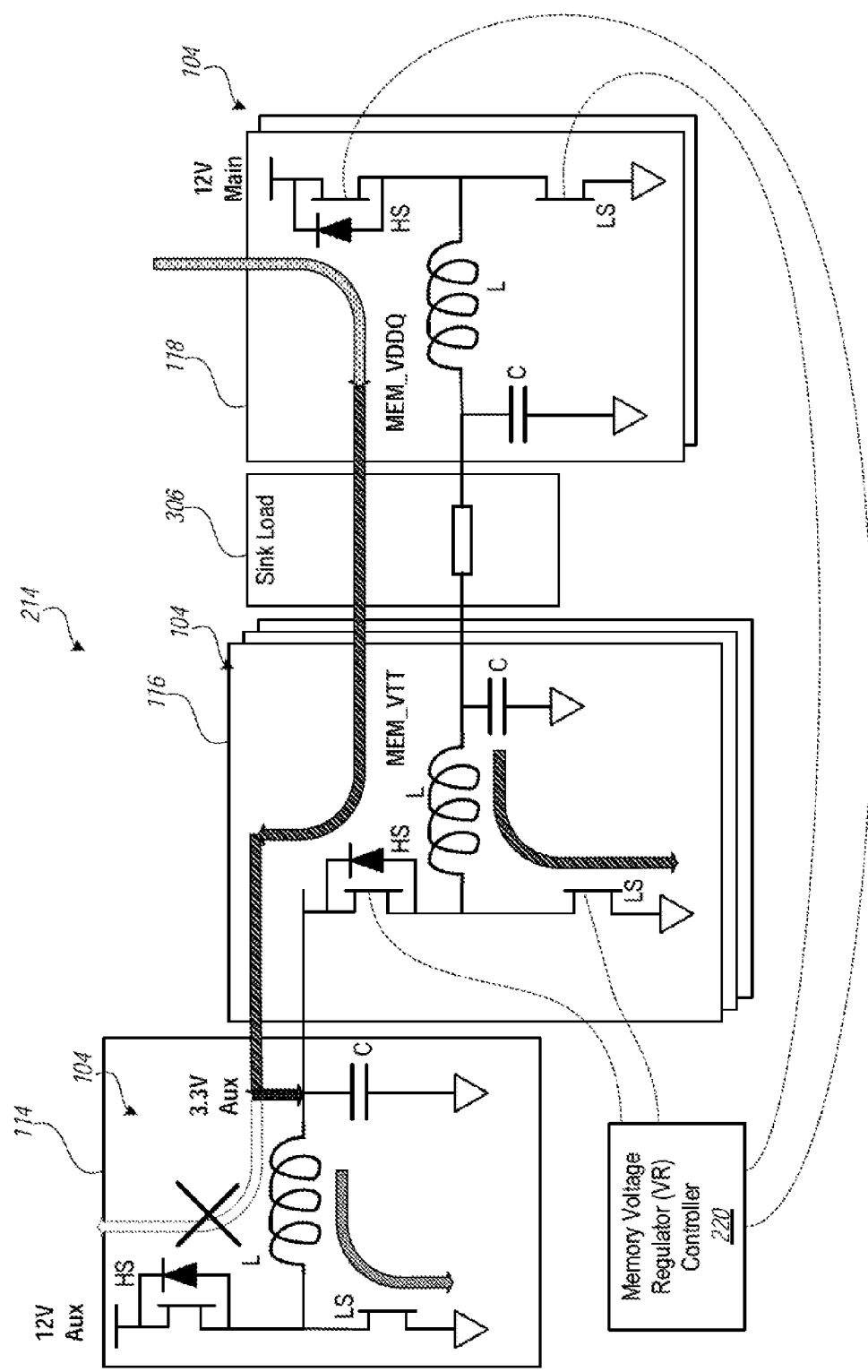
FIG. 3 illustrates a schematic block diagram of an example memory voltage regulator system formed by synchronous Buck VRs that interface with a sink load, according to one or more embodiments.

FIG. 3 illustrates an example memory voltage regulator system 214 formed by synchronous Buck VRs 104 that interface with a sink load 306. The memory VDDQ VR 118, and the memory VTTQ VR 116 are synchronous Buck VRs 104 that operate in either FCCM or a discontinuous conduction mode (DCM) under switching control by a memory VR controller 220. In particular, the 3.3V AUX VR 114 is one synchronous Buck VR 104 that is positively biased by 12V_AUX and which provides a middle conversion for 3.3 V_AUX that cannot sink current for a sink load 306.

Switching modes to FCCM can avoid an over voltage protection error. Generally-known voltage regulation focuses on system light load efficiency by changing mode of operation or slowing down switching frequency in light load to save power conversion loss. Due to the nature of light load operation, the synchronous Buck VR is emulating the traditional Buck (diode on LS), so that the VR cannot sink load current. This mode of operating by the synchronous Buck VR can create an over voltage (OV) fault event if the VR is connected with a sinking load, such as MEM_VTT, which can cause system shut down. In the present disclosure, the memory voltage regulator system 214 maintains the voltage regulation with sinking load and adaptively and seamlessly switches mode so that system reliability and power conversion efficiency can be both improved.

Figure 4:
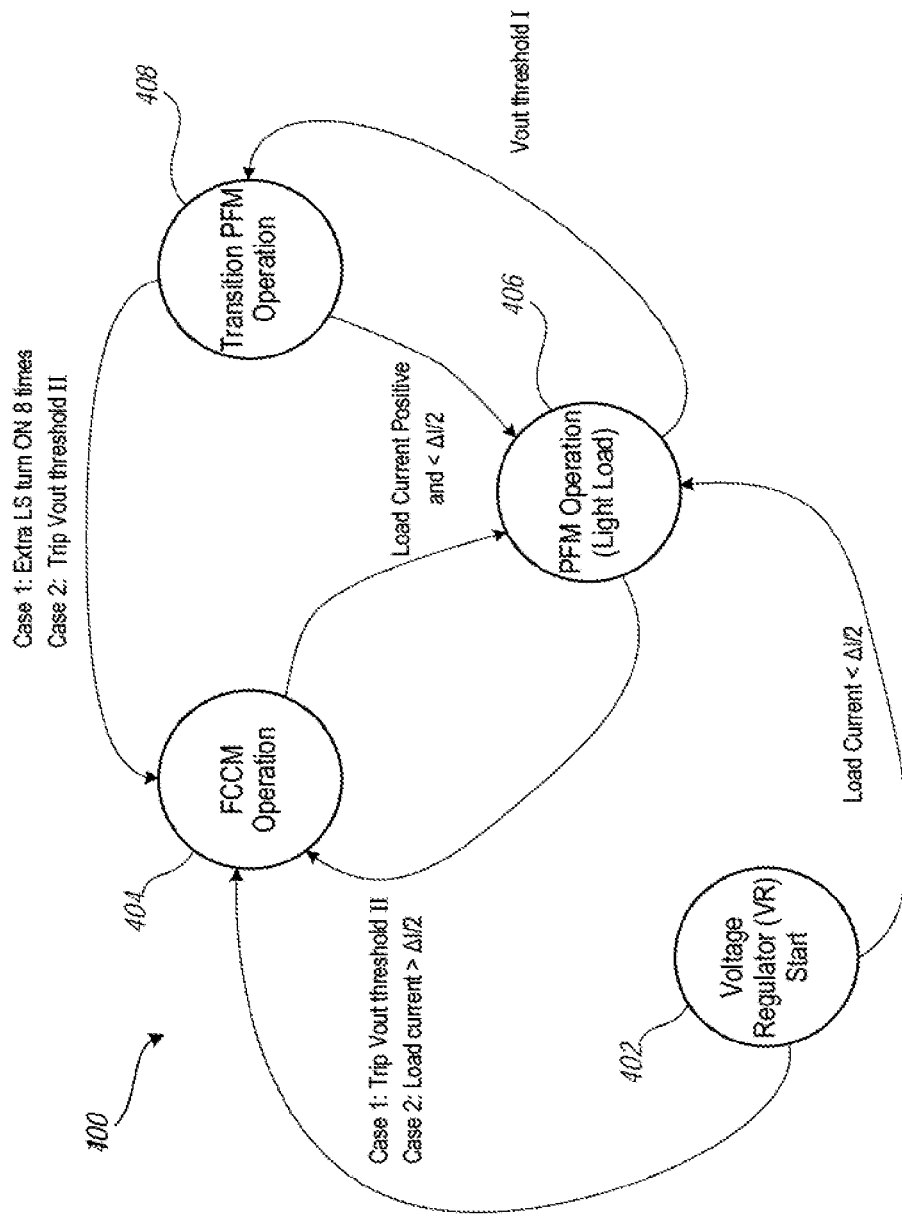
FIG. 4 illustrates a state machine diagram of operation modes of the memory voltage regulator system of FIG. 3 that can handle both light loads and sink loads, according to one or more embodiments.

FIG. 4 illustrates a state machine diagram 400 of operation modes of the memory voltage regulator system 214 (FIG. 3) that can handle both light load and sink load. Voltage regulation operation is active regulation after soft-start operation 402 is completed. Voltage regulation can directly enter FCCM operation 404 or PFM operation 406 by incorporating load current information. If the positive excursion of Vout trips the voltage threshold II, voltage regulation directly enters FCCM operation 404 to regulate down the overshoot. If positive excursion of Vout only trips the threshold I, voltage regulation actively turns on LS with predefined pulse width to discharge the output as transition PFM operation 408. If Vout is still tripping threshold I after eight (8) consecutive cycles or Vout trips threshold II, voltage regulation can enter FCCM operation 404 to sink the load current in every switching cycle. VR can switch back to PFM operation 406 in response to detecting a positive load current value that is less than half of load current ripple.

Figure 5:
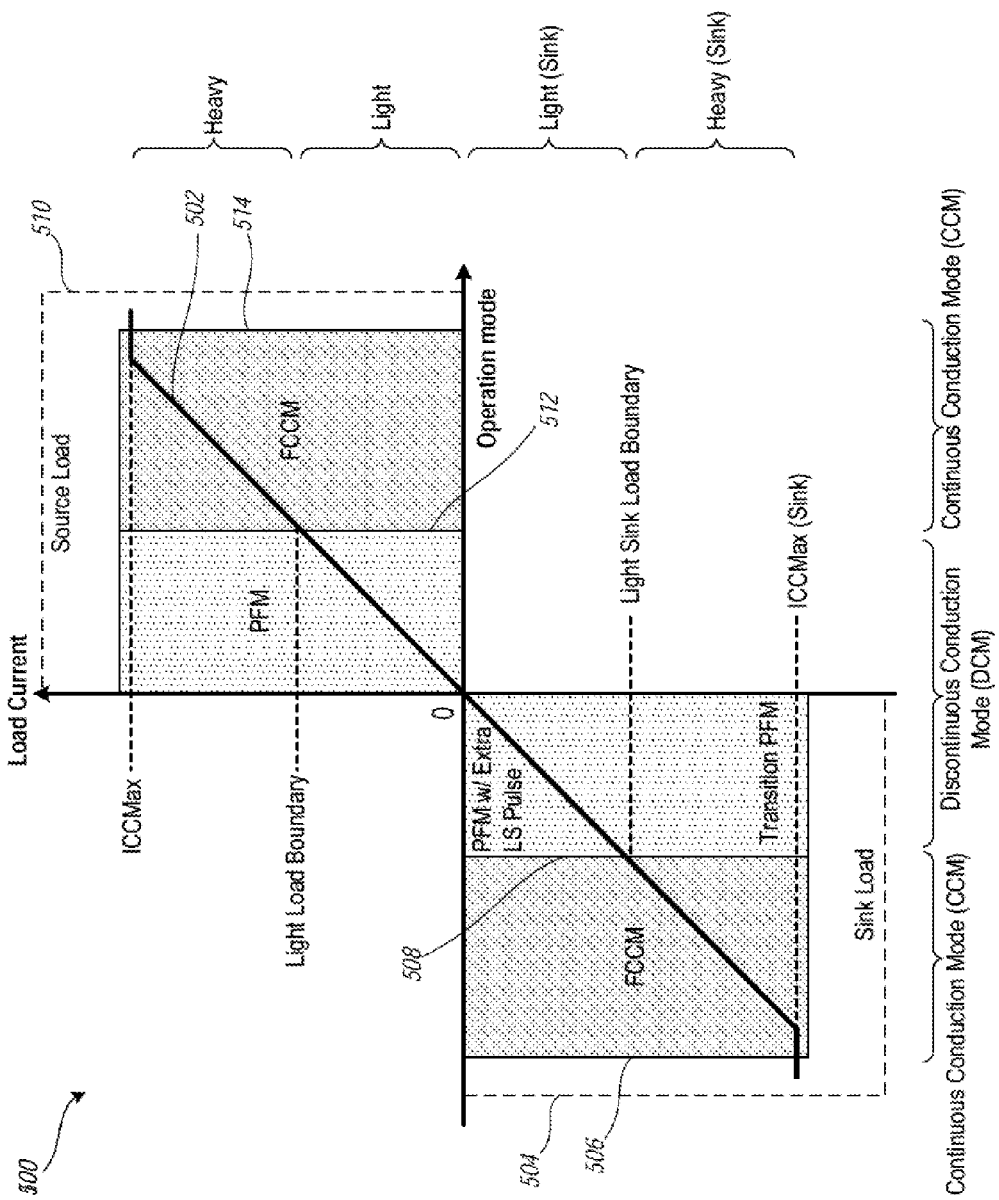
FIG. 5 illustrates a plot of load profile versus operation mode for the memory voltage regulator system of FIG. 3, according to one or more embodiments.

FIG. 5 illustrates a plot 500 of load profile versus operation mode of a current trace 502 that begins from an ICCMax sink value in a sink load portion 504 that includes a sinking FCCM portion 506, which switches to a transition PFM portion 508 upon reaching a light sink load boundary. ICCMax sink value refers to a maximum current of the synchronous Buck VR. As the current trace 502 becomes positive and enters a source load portion 510, the operation mode begins in a PFM portion 512. As the current trace 502 is equal to or greater than a light load boundary, the operation mode becomes FCCM 514. The current trace 502 reaches an upper limit of ICCMax.

Figure 6:
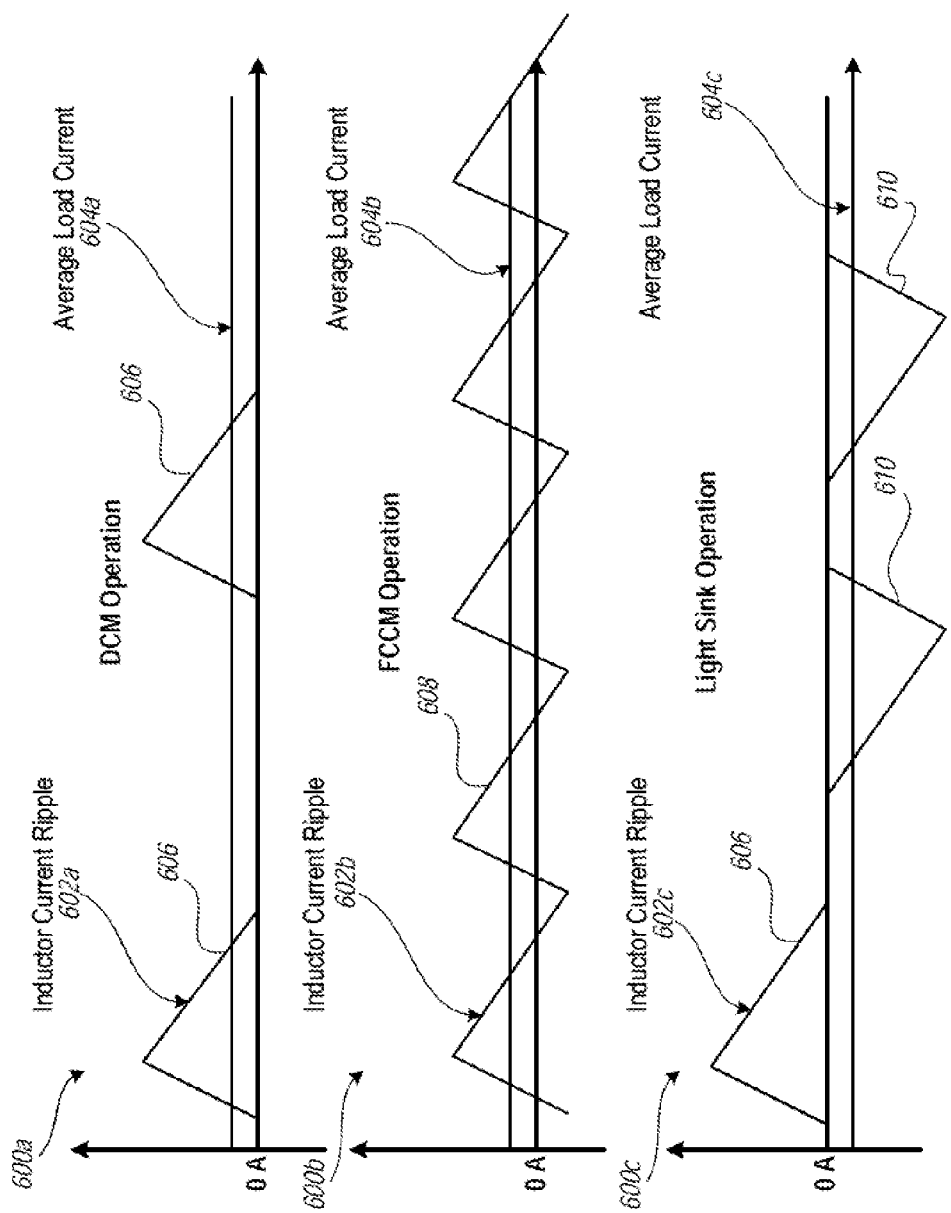
FIG. 6 illustrates graphs of inductor current versus mode of operation for discontinuous conduction mode (DCM), forced continuous conduction mode (FCCM) and transition pulse frequency modulation (PFM) mode for light sink operation, according to one or more embodiments.

FIG. 6 illustrates graphs 600a-600c of inductor current versus mode of operation for DCM, FCCM and light sink operation (transitional PFM). The DCM operation 600a includes an inductor current ripple 602a having an average load current 604a formed by PFM separated LS on pulses 606. The FCCM operation 600b includes a continuous inductor current ripple 602b having an average load current 604b formed by repeated and continuous LS on pulses 608. The transitional PFM operation 600c includes a inductor current ripple 602c having an average load current 604c formed by an extra LS on pulse 606 in addition to PFM separated sinking pulses 610.

Figure 7:
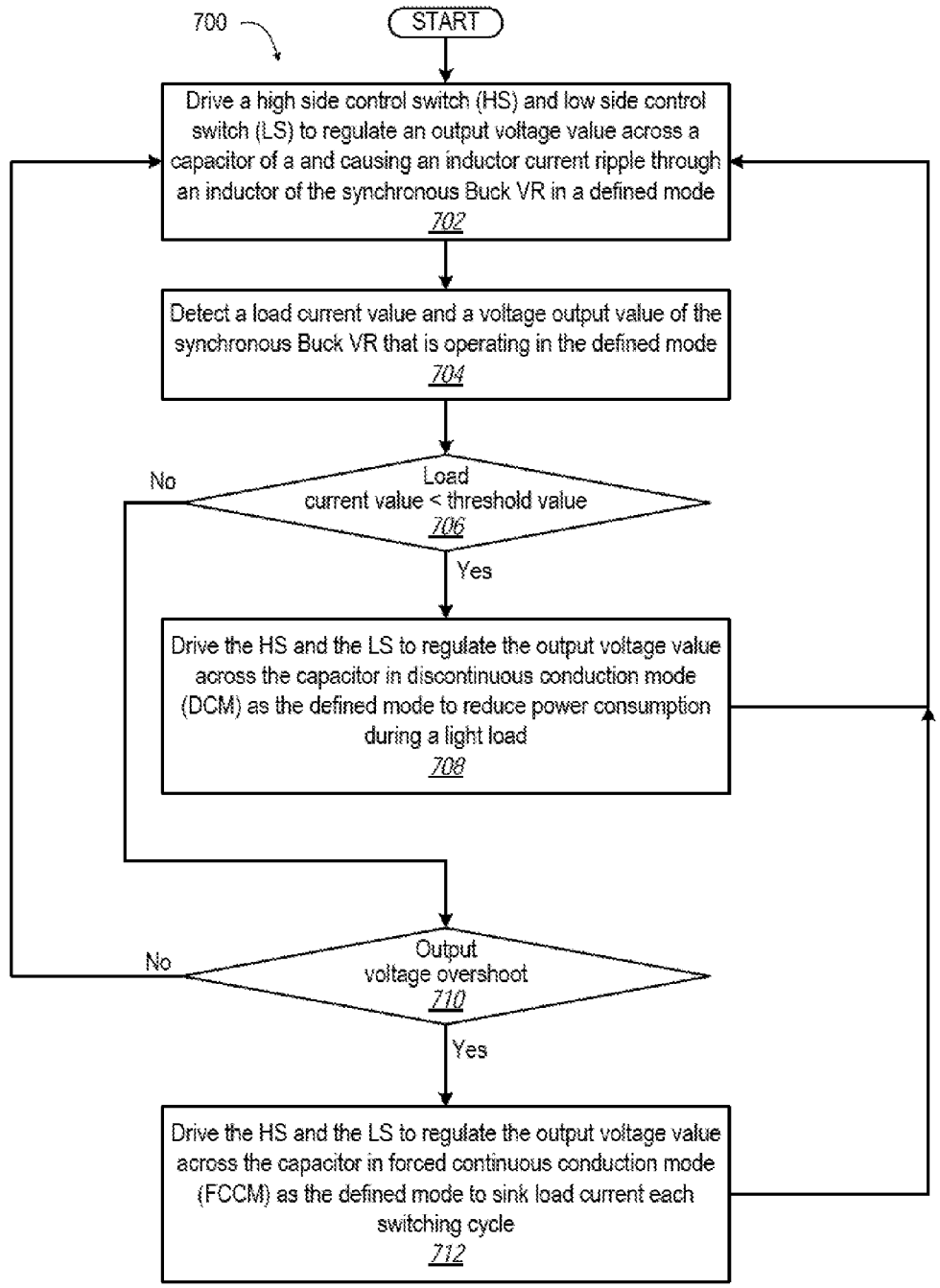
FIG. 7 illustrates a method for switching DC-DC voltage regulation for light and sinking loads, according to one or more embodiments.

FIG. 7 illustrates a method 700 for switching DC-DC voltage regulation for light and sinking loads. In one embodiment, the method 700 begins at start block. A controller drives a high side control switch (HS) and low side synchronous switch (LS) to regulate an output voltage value across a capacitor of a synchronous Buck voltage regulator (VR) in a defined mode. Driving HS and LS causes an inductor current ripple through an inductor of the synchronous Buck VR (block 702). The method 700 includes detecting a load current value and a voltage output value of the synchronous Buck VR that is operating in the defined mode (block 704). The method 700 includes determining whether the load current value is equal to or greater than a threshold value (decision block 706). In response to determining in decision block 706 that the load current value is less than a threshold value, the method 700 includes driving the HS and the LS to regulate the output voltage value across the capacitor in discontinuous conduction mode (DCM) as the defined mode, to reduce power consumption during a light load (block 708). Then method 700 returns to block 702 to continue in the defined mode.

In response to determining in decision block 706 that the load current value is equal to or greater than the threshold value, then method 700 includes further determining whether an electrical characteristic of the synchronous Buck VR is indicative of an overshoot (decision block 710). In response to determining in decision block 710 that the electrical characteristic is indicative of overshoot, the method 700 includes driving the HS and LS to cause the synchronous Buck VR to perform forced continuous conduction mode (FCCM) as the defined mode. FCCM avoids a voltage output overshoot condition by sinking the load current each switching cycle (block 712). Then method 700 returns to block 702 to continue in the defined mode. In response to determining in decision block 710 that the electrical characteristic is not indicative of an overshoot, then method 700 returns to block 702 to continue detecting a load current value and a voltage output value in the defined mode.

Figure 8:
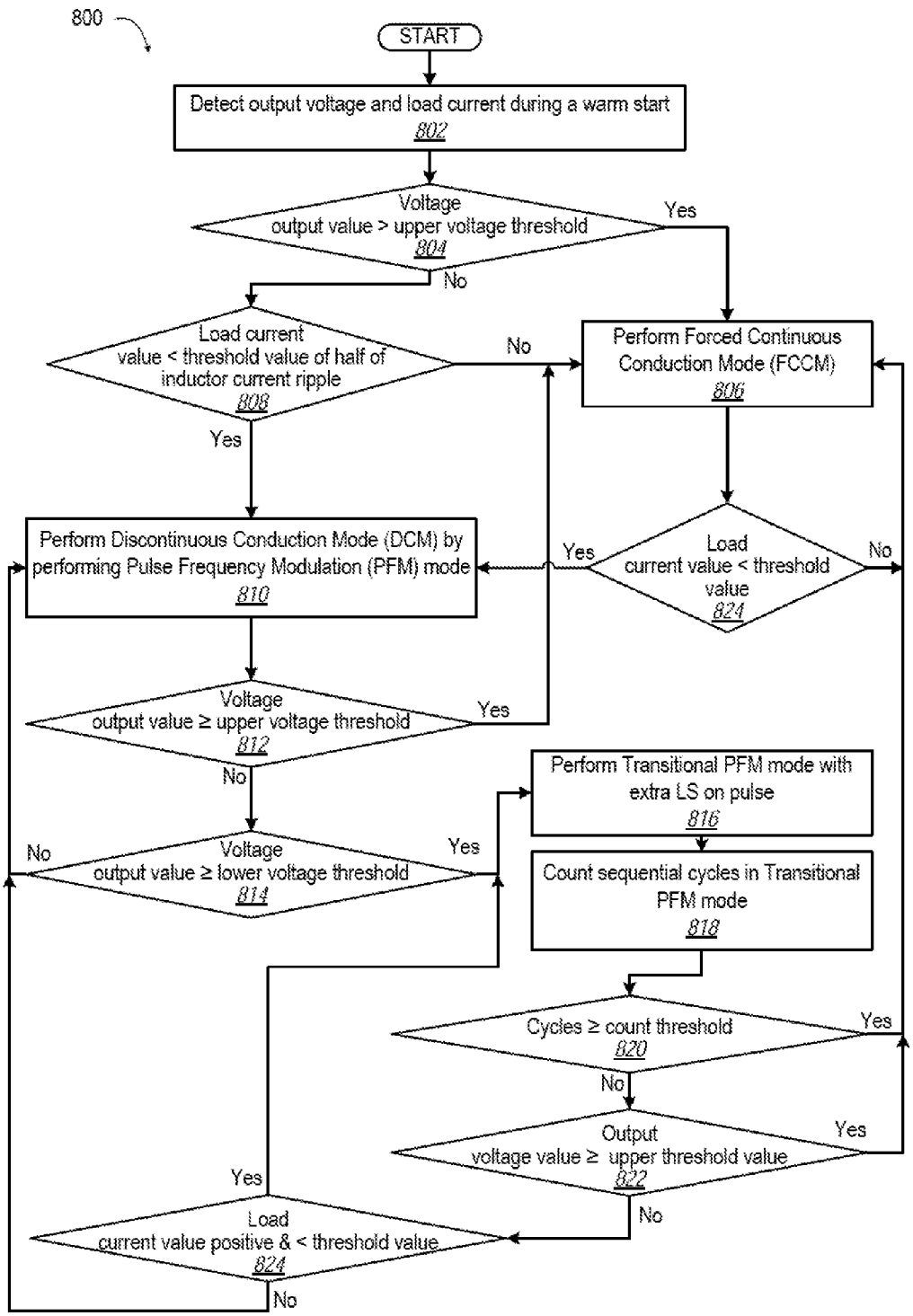
FIG. 8 illustrates an example method of switching DC-DC voltage regulation for light and sinking loads, according to one or more embodiments.

FIG. 8 illustrates a method 800 of switching DC-DC voltage regulation for light and sinking loads. In one embodiment, the method 800 includes detecting output voltage value and load current value during a warm start of a synchronous Buck VR (block 802). A controller determines whether one of the output voltage value and load current value indicates an electrical characteristic indicative of a voltage overshoot of the output voltage. In one embodiment, the controller determines whether the output voltage value of the synchronous block VR is greater than or equal to an upper voltage value (decision block 804). In response to determining in decision block 804 that the output voltage value is greater than or equal to the upper voltage threshold, the controller drives the HS and the LS to cause the synchronous Buck VR to perform FCCM (block 806). In response to determining in decision block 804 that the output voltage value is less than the upper voltage threshold, the controller detects whether the load current value is less than a threshold value of half of an inductor current ripple of the synchronous block VR (decision block 808). In response to determining in decision block 808 that the load current value is greater than or equal to the threshold value, the controller drives the HS and the LS to cause the synchronous Buck VR to perform FCCM, which avoids and/or mitigates an voltage output overshoot condition by sinking the load current each switching cycle (block 806). The load current being above the threshold value is another electrical characteristic that is indicative of an overshoot condition.

In response to determining in decision block 808 that the load current value is less than the threshold value, the controller drives the HS and the LS to cause the synchronous Buck VR to perform DCM to reduce power consumption during the light load or light sinking load by performing PFM (block 810). While performing DCM, the controller detects whether the voltage output value is equal to or greater than the upper voltage threshold (decision block 812). In response to detecting in decision block 812 that the voltage output value is equal to or greater than the upper voltage threshold, the controller drives the HS and LS to cause the synchronous Buck VR to perform FCCM (block 806).

In one embodiment, performing DCM comprises initially performing PFM mode and in certain situations subsequently performing transitional PFM mode (block 810). In response to detecting in decision block 812 that the voltage output value is less than the upper voltage threshold, the controller further determines whether the output voltage is equal to or greater than a lower voltage threshold (decision block 814). In response to determining in decision block 814 that the voltage output value is less than the lower voltage threshold, the method 800 returns to block 810 to continue performing PFM mode. In response to determining in decision block 814 that the voltage output value is equal to or greater than the lower voltage threshold, the controller drives the HS and LS to cause the synchronous Buck VR to perform the transitional PFM mode (block 816). The transitional PFM mode involves performing PFM mode with an extra LS on pulse of predefined pulse width to discharge an output of the synchronous buck VR. The controller counts a number of sequential cycles in transitional PFM mode (block 818). The controller determines whether the number of sequential cycles in transitional PFM mode is equal to or greater than a count threshold, such as eight (8) (decision block 820). In response to determining in decision block 820 that the number of sequential cycles in transitional PFM mode is equal to or greater than the count threshold, the controller drives the HS and LS to cause the synchronous Buck VR to perform FCCM (block 806). In response to determining in decision block 820 that the number of sequential cycles in transitional PFM mode is less than the count threshold, the controller determines whether the output voltage value is greater than or equal to the upper voltage value of the synchronous block VR (decision block 822). In response to determining in decision block 822 that the output voltage value is greater than or equal to the upper voltage threshold, the controller drives the HS and the LS to cause the synchronous Buck VR to perform FCCM (block 806). In response to determining in decision block 820 that the output voltage value is less than the upper voltage threshold, the controller detects whether the load current value is positive and less than the threshold value (decision block 824). In response to detecting in decision block 824 that the load current value is positive and is less than the threshold value, the controller drives the HS and LS to perform PFM mode (block 810). In response to detecting in decision block 822 that the load current value is either negative or is not less than the threshold value, the method 800 returns to block 816 to continue performing transitional PFM mode.

When in FCCM in block 806, the controller determines whether the load current value is less than the threshold value (decision block 824). In response to determining in decision block 824 that the load current is less than the threshold value, the method 800 returns to block 810 to perform PFM mode. In response to determining in decision block 824 that the load current is equal to or greater than the threshold value, the method 800 returns to block 806 to continue performing FCCM.

In the above described flow charts of FIGS. 7-8, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A switching direct current to direct current (DC-DC) voltage regulator (VR) for light and sinking loads, the switching DC-DC VR comprising:
    a synchronized Buck VR;
    a controller in electrical communication with the synchronous Buck VR to regulate the output voltage value by:
        detecting a load current value and a voltage output value of the synchronous Buck VR;
        in response to detecting that the load current value is not greater than a threshold value, causing the synchronous Buck VR to perform discontinuous conduction mode (DCM) to reduce power consumption during a light load; and
        in response to detecting an electrical characteristic indicative of a voltage overshoot of the output voltage, causing the synchronous Buck VR to perform forced continuous conduction mode (FCCM) in order to avoid or mitigate a voltage output overshoot condition by sinking the load current each switching cycle.

2. The switching DC-DC VR of claim 1, where:
    the synchronized Buck VR comprises:
        an inductor electrically connected between a phase node and an output node;
        a capacitor electrically connected between the output node and ground;
        a high side control switch (HS) electrically connected between a power supply and the phase node;
        a low side synchronous switch (LS) electrically connected between a ground and the phase node;
        a load current sensor electrically connected to the phase node to detect the load current value;
        an output voltage sensor electrically connected across the output node and the ground to detect the output voltage value; and
        the controller is placed/provided in electrical connection with the HS and LS and in electrical communication with the load current sensor and the output voltage sensor to regulate the output voltage value across the capacitor by switching on and off the HS and LS to cause an inductor current ripple through the inductor.

3. The switching DC-DC VR of claim 2, wherein the controller further:
    detects a start condition of the synchronous Buck VR;
    in response to detecting the start condition and further that the load current value is less than the threshold value, drives the HS and the LS to cause the synchronous Buck VR to perform DCM to reduce power consumption during the light load; and
    in response to detecting the start condition and further in response to detecting that a selected one of the voltage output value is equal to or greater than the upper voltage threshold and that the load current value equals or is greater than the threshold value during DCM, drive the HS and LS to cause the synchronous Buck VR to perform FCCM to avoid the voltage output overshoot condition by sinking the load current each switching cycle.

4. The switching DC-DC VR of claim 2, wherein the threshold value is one half of the inductor current ripple.

5. The switching DC-DC VR of claim 2, wherein the controller drives the HS and LS to cause the synchronous Buck VR to perform DCM by performing pulse frequency modulation (PFM) mode.

6. The switching DC-DC VR of claim 5, wherein the controller further:
    in response to detecting that the voltage output value is equal to or greater than a lower voltage threshold during PFM mode, drives the HS and LS to cause the synchronous Buck VR to perform a transitional PFM mode by performing PFM with an extra LS on pulse of predefined pulse width to discharge the output node of the synchronous buck VR; and
    in response to detecting that the load current is positive and is less than the threshold value during the transitional PFM mode, drives the HS and LS to cause the synchronous Buck VR to perform PFM mode.

7. The switching DC-DC VR of claim 6, wherein the controller is further to:
    in response to detecting that voltage output value is equal to or greater than the upper voltage threshold during PFM mode, drives the HS and LS to cause the synchronous Buck VR to perform FCCM.

8. The switching DC-DC VR of claim 6, wherein the controller is further to:
    counts a number of sequential cycles in transitional PFM mode; and
    in response to detecting that the number of sequential cycles in transitional PFM mode is equal to or greater than a count threshold, drives the HS and LS to cause the synchronous Buck VR to perform FCCM.

9. The switching DC-DC VR of claim 8, wherein the count threshold is 8.

10. The switching DC-DC VR of claim 1, wherein the controller detects the electrical characteristic indicative of the overshoot of the output voltage by detecting that the voltage output value is equal to or greater than an upper voltage threshold during DCM.

11. The switching DC-DC VR of claim 1, wherein the controller detects the electrical characteristic indicative of the overshoot of the output voltage by detecting that the load current value is equal to or greater than the threshold value during DCM.

12. An information handling system comprises the switching DC-DC VR of claim 1.

13. A method for switching direct current to direct current (DC-DC) voltage regulation for light and sinking loads, the method comprising:
- detecting a load current value and a voltage output value of a synchronous Buck voltage regulator (VR);
- in response to detecting that the load current value is less than a threshold value, driving a high side control switch (HS) and low side synchronous switch (LS) to regulate an output voltage value across a capacitor by causing an inductor current ripple through an inductor of the synchronous Buck VR in discontinuous conduction mode (DCM) to reduce power consumption during a light load; and
- in response to detecting an electrical characteristic indicative of a voltage overshoot of the output voltage, driving the HS and LS to cause the synchronous Buck VR to perform forced continuous conduction mode (FCCM) in order to avoid or mitigate a voltage output overshoot condition by sinking the load current each switching cycle.

14. The method of claim 13, further comprising:
detecting a start condition of the synchronous Buck VR;
in response to detecting the start condition and further in response to detecting that the load current value is less than the threshold value, driving the HS and the LS to cause the synchronous Buck VR to perform DCM to reduce power consumption during the light load; and
in response to detecting the start condition and further in response to detecting that a selected one of the voltage output value is equal to or greater than the upper voltage threshold and that the load current value is equal to or greater than the threshold value during DCM, driving the HS and LS to cause the synchronous Buck VR to perform FCCM to avoid the voltage output overshoot condition by sinking the load current each switching cycle.

15. The method of claim 13, wherein the threshold portion comprises one half of the inductor current ripple.

16. The method of claim 13, wherein driving HS and LS to cause the synchronous Buck VR to perform DCM further comprises performing pulse frequency modulation (PFM) mode.

17. The method of claim 16, further comprising:
in response to detecting that the voltage output value is equal to or greater than a lower voltage threshold during PFM mode, driving the HS and LS to cause the synchronous Buck VR to perform a transitional PFM mode by performing PFM with an extra LS on pulse of predefined pulse width to discharge an output of the synchronous buck VR; and
in response to detecting that the load current is positive and is less than the threshold value during transitional PFM mode, driving the HS and LS to cause the synchronous Buck VR to perform PFM mode.

18. The method of claim 17, further comprising:
in response to detecting that voltage output value is equal to or greater than the upper voltage threshold during transitional PFM mode, driving the HS and LS to cause the synchronous Buck VR to perform FCCM.

19. The method of claim 17, further comprising:
counting a number of sequential cycles in transitional PFM mode; and
in response to detecting that the number of sequential cycles in transitional PFM mode is equal to or greater than a count threshold, driving the HS and LS to cause the synchronous Buck VR to perform FCCM.

20. The method of claim 19, wherein the count threshold is 8.

21. The method of claim 13, further comprising driving the HS and LS to cause the synchronous Buck VR to perform FCCM in response to detecting that the voltage output value is equal to or greater than the upper voltage threshold during DCM.

22. The method of claim 13, wherein driving the HS and LS to cause the synchronous Buck VR to perform FCCM is in response to detecting that the load current value is equal to or greater than the threshold value during DCM.

* * * * *